United States Patent
Shah et al.

(10) Patent No.: US 9,676,628 B2
(45) Date of Patent: Jun. 13, 2017

(54) INTEGRATED PROCESS AND APPARATUS FOR RECOVERY OF HELIUM RICH STREAMS

(71) Applicants: Minish M. Shah, East Amherst, NY (US); Joseph M. Schwartz, Williamsville, NY (US); Khushnuma Koita, Buffalo, NY (US); Michael J. Dray, Amherst, NY (US)

(72) Inventors: Minish M. Shah, East Amherst, NY (US); Joseph M. Schwartz, Williamsville, NY (US); Khushnuma Koita, Buffalo, NY (US); Michael J. Dray, Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 136 days.

(21) Appl. No.: 14/618,672

(22) Filed: Feb. 10, 2015

(65) Prior Publication Data

US 2016/0231051 A1    Aug. 11, 2016

(51) Int. Cl.
*B01D 53/22* (2006.01)
*C01B 23/00* (2006.01)
(Continued)

(52) U.S. Cl.
CPC ........ *C01B 23/0042* (2013.01); *B01D 53/229* (2013.01); *C01B 3/501* (2013.01); *C01B 3/506* (2013.01); *C01B 23/0078* (2013.01); *F25J 3/061* (2013.01); *F25J 3/062* (2013.01); *F25J 3/069* (2013.01); *F25J 3/0625* (2013.01); *F25J 3/0655* (2013.01); *B01D 53/226* (2013.01); *B01D 2256/18* (2013.01); *B01D 2317/025* (2013.01); *C01B 2203/0405* (2013.01); *C01B 2203/046* (2013.01); *C01B 2203/0465* (2013.01); *C01B 2210/005* (2013.01); *C01B 2210/007* (2013.01); *C01B 2210/0046* (2013.01); *C01B 2210/0082* (2013.01); *F25J 2205/40* (2013.01); *F25J 2205/60* (2013.01); *F25J 2205/80* (2013.01); *F25J 2210/04* (2013.01); *F25J 2210/20* (2013.01);
(Continued)

(58) Field of Classification Search
CPC .. B01D 53/226; B01D 53/229; B01D 53/047; B01D 2256/16; B01D 2256/18; B01D 2317/02; B01D 2317/022; B01D 2317/025; C01B 23/0021; C01B 23/0042; C01B 23/0047; C01B 2210/0004; C01B 2210/001; C01B 2210/0012; C01B 2210/0031; C01B 2210/0053; C01B 2210/007; F25J 3/029; F25J 3/0252
USPC ................................ 95/53, 55, 56
See application file for complete search history.

(56) References Cited

U.S. PATENT DOCUMENTS

3,807,185 A    4/1974    Forg et al.
4,659,351 A    4/1987    Stuber et al.
(Continued)

*Primary Examiner* — Jason M Greene
(74) *Attorney, Agent, or Firm* — Iurie A. Schwartz (57) ABSTRACT

The present invention relates a process and apparatus that recovers a helium rich stream from a mixed gas having low concentrations of helium therein. More specifically, the invention relates to an integrated process and apparatus for treating a mixed feed gas from an operating process that produces a liquid product from natural gas containing helium, such as processes that produce ammonia, methanol, or liquid hydrocarbons.

25 Claims, 4 Drawing Sheets

(51) Int. Cl.
  *F25J 3/02* (2006.01)
  *C01B 3/50* (2006.01)
  *F25J 3/06* (2006.01)

(52) U.S. Cl.
  CPC ........ *F25J 2210/42* (2013.01); *F25J 2230/30* (2013.01); *F25J 2270/904* (2013.01); *Y02P 20/125* (2015.11); *Y02P 20/132* (2015.11)

(56) References Cited

U.S. PATENT DOCUMENTS

| | | | |
|---|---|---|---|
| 4,675,030 A * | 6/1987 | Czarnecki | B01D 53/226 95/39 |
| 4,687,498 A * | 8/1987 | Maclean | B01D 53/229 62/624 |
| 4,717,407 A * | 1/1988 | Choe | B01D 53/229 210/500.21 |
| 5,064,446 A * | 11/1991 | Kusuki | B01D 53/226 95/53 |
| 5,080,694 A | 1/1992 | Knoblauch et al. | |
| 5,089,048 A | 2/1992 | Knoblauch et al. | |
| 5,224,350 A | 7/1993 | Mehra | |
| 5,632,803 A | 5/1997 | Stoner et al. | |
| 5,787,730 A | 8/1998 | Heim et al. | |
| 6,161,397 A * | 12/2000 | McNeil | F25J 3/0252 62/624 |
| 6,221,131 B1 * | 4/2001 | Behling | B01D 53/226 95/50 |
| 6,281,403 B1 | 8/2001 | White et al. | |
| 6,899,744 B2 | 5/2005 | Mundschau | |
| 7,604,681 B2 | 10/2009 | Malsam et al. | |
| 7,781,049 B2 | 8/2010 | Apte et al. | |
| 7,871,577 B2 | 1/2011 | Allam et al. | |
| 8,101,243 B2 | 1/2012 | Way et al. | |
| 8,152,898 B2 | 4/2012 | Prasad et al. | |
| 2003/0221448 A1 | 12/2003 | Shoji et al. | |
| 2005/0217479 A1 * | 10/2005 | Hale | B01D 53/228 95/53 |
| 2010/0101410 A1 * | 4/2010 | Prasad | C01B 23/0042 95/53 |
| 2013/0098242 A1 | 4/2013 | Ungerank et al. | |
| 2016/0115029 A1 * | 4/2016 | Van Leuvenhaege | B01D 53/229 423/262 |

* cited by examiner

INTEGRATED PROCESS AND APPARATUS
FOR RECOVERY OF HELIUM RICH
STREAMS

BACKGROUND OF THE INVENTION

Field of the Invention

The present invention relates to a process and apparatus that recovers a helium rich stream from a mixed gas having low concentrations of helium therein. More specifically, the invention relates to an integrated process and apparatus for treating a mixed feed gas from an operating process that produces a liquid product from natural gas containing helium, such as processes that produce ammonia, methanol, or liquid hydrocarbons.

Description of Related Art

Helium is a rare gas, which has unique physical properties making it valuable in a wide range of commercial applications. For instance, helium is inert, its boiling and melting points are the lowest among the elements, it is the second lightest element, and it exists only as a gas in all but the most cryogenic conditions. Commercial applications range from balloons to lasers and include heat transfer and cooling applications; shielding applications; gas tracing applications; inert environments for growing crystals; and numerous other applications. However, due to its limited availability and increasing commercial demand, its costs have increased significantly over that the last few years.

While helium is the second most abundant element in the universe, it is extremely rare on Earth. In fact, it is a finite resource and is primarily found trapped with natural gas in concentrations up to about seven percent by volume although most often, it is found in concentrations of less than 0.5% by volume. Almost all of the commercial helium requirements are supplied by the extraction from helium-containing natural gas by low temperature fractional distillation processes. The resulting helium rich gases are further purified or refined using additional cryogenic distillation steps or by pressure swing adsorption (PSA) processes which selectively remove other gases. These final refining steps result in commercial grades of helium in excess of 99.9%.

The high cost and limited availability of helium gas has resulted in investigations to identify other sources of helium. The source most relevant to the present invention is hydrogen containing gas streams produced from or existing in various current commercial processes. Process gas streams such as those from the production of hydrogen, or which recycle hydrogen, can contain helium in concentrations which can be economically extracted and recovered. For example, processes for the production of synthesis gas ($CO/H_2$), which is typically further used in hydrogen production, ammonia production or used in certain Fischer-Tropsch reactions, typically begin with natural gas feed streams. The various processing and recycling steps do not normally separate the inert helium already present from the natural gas feed stream and it often accumulates in the processing steps. The resulting recycle and purge gas can contain helium in concentrations of up to 2% or more by volume.

Processes using multi-step cryogenic distillation or hybrid PSA systems for removing or extracting helium from natural gas or other gases containing low concentrations of helium are known. These processes are typically directed to natural gas feed streams and require significant capital investments and complex and expensive cryogenic distillation systems to generate the enriched helium gas streams which can be further processed or integrated into the starting extraction process. Similarly, related processes for the recovery of helium from refinery off gases have been taught.

In U.S. Pat. No. 3,807,185, helium containing vent gas from the synthesis of ammonia is subjected to several partial condensation steps and then cooled to remove the higher-boiling components, namely, methane, nitrogen, and argon in a phase separator. A low temperature stripping column is then employed to recover liquid hydrogen and a gaseous helium/hydrogen mixture. Hydrogen and argon can also be recovered. This process requires multiple cooling and heating steps and, the hydrogen feed stream must be condensed at extremely low temperatures requiring high capital equipment costs and high power requirements.

U.S. Pat. No. 5,089,048 discloses a method for extracting helium from a relatively helium poor gas mixture through a pressure swing adsorption process which allegedly achieves an enriched product gas containing over 50% helium.

U.S. Pat. No. 7,871,577 discloses a gas-to-liquids process where a hydrogen-helium mixture is produced by cryogenic separation. Specifically, higher the molecular weight hydrocarbon compounds or oxygenates are produced from a gas comprising methane in a process including the steps of generating synthesis gas by reaction of a gas including methane with steam and/or an oxidant gas comprising oxygen, producing higher molecular weight hydrocarbon compounds or oxygenates in a syngas conversion process, removing offgas including unreacted hydrogen and unreacted carbon monoxide from the syngas conversion process and separating cryogenically unreacted hydrogen from the offgas or from a gas derived therefrom to produce separated hydrogen product that is substantially free of unreacted carbon monoxide and a first cryogenic liquid including unreacted carbon monoxide.

U.S. Pat. No. 8,152,898 discusses helium recovery from gas streams containing high concentrations of hydrogen gas and low concentrations of helium gas, such as from the recycle stream from the production of ammonia.

The related art discussed, above, does not address the recovery of a helium stream from an upstream process (e.g. ammonia plant or gas-to-liquids plant) where the offgas is processed through cryogenic separation in combination with one or more hydrogen transport membranes.

The mixed offgas from the upstream source generally contains hydrogen, which has a very low boiling point (i.e., similar to helium), and which hinders the separation process. One of the advantages associated with the present invention is that through the employment of a hydrogen transport membrane, in the system of the present invention, the hydrogen-helium separation is achieved.

Other objects and aspects of the present invention will become apparent to one of ordinary skill in the art upon review of the specification, drawings and claims appended hereto.

SUMMARY OF THE INVENTION

According to an aspect of the invention, an integrated process for recovery of a helium rich stream from a feed stream containing 10-80 volume percent hydrogen, 0.1-5.0 volume percent helium and the balance being higher boiling components. The process includes:
(a) routing a pressurized feed stream to a cryogenic separation unit wherein the majority of the higher boiling components are separated and removed from the feed stream;
(b) heating the stream containing helium removed from the cryogenic separation unit and routing the heated stream to at least one hydrogen transport membrane where the heated stream is separated into a hydrogen rich permeate stream, and a retentate stream depleted of hydrogen;
(c) routing the retentate stream depleted of hydrogen to at least one oxidation unit and reacting it with an oxidant to remove substantially all the remaining hydrogen in the retentate to produce a helium containing stream, wherein the helium concentration ranges from about 5-40 volume percent and the balance being higher boiling components;
(d) routing the helium containing stream to a phase separator and sequentially a dryer wherein most of the water is removed; and
(e) routing the dried helium containing stream to the same or a different cryogenic separation unit where the majority of remaining higher-boiling components are removed and a helium rich product stream having about 80% or higher helium content by volume is obtained.

According to another aspect of the invention, an integrated apparatus for recovery of a helium rich stream and a hydrogen rich stream from a feed stream containing 10-80 volume percent hydrogen, 0.1-5.0 volume percent helium, and the balance being higher-boiling components. The apparatus includes:
(a) a cryogenic separation unit to receive a pressurized feed stream where a majority of the higher boiling components are separated and removed from the feed stream;
(b) a heater/heat exchanger to warm the stream received from the cryogenic separation unit;
(c) at least one hydrogen transport membrane to receive the warmed stream where the warmed stream is separated into a hydrogen rich permeate stream, and a retentate stream depleted of hydrogen;
(d) at least one oxidation unit to receive the retentate stream depleted of hydrogen to remove substantially all the hydrogen remaining in the retentate to produce a helium containing stream, wherein the helium is in an amount ranging from about 5-40 volume percent and the balance being higher boiling components;
(e) a phase separator to receive the helium containing stream from the at least one oxidation unit, and remove the water from this stream; and
(f) the same or different cryogenic separation unit as in step (b) to receive helium containing stream depleted of water and further remove the remaining higher-boiling components to produce a product stream having 80% or higher helium content by volume.

BRIEF DESCRIPTION OF THE FIGURES

The objects and advantages of the invention will be better understood from the following detailed description of the preferred embodiments thereof in connection with the accompanying figures wherein like numbers denote same features throughout and wherein.

DETAILED DESCRIPTION OF THE INVENTION

The present invention provides a system for the recovery of a helium rich stream from an off-gas feed stream coming from an upstream plant which produces either ammonia, methanol or liquid hydrocarbons. In these plant operating processes or units, the off-gas streams produced contain helium in a higher concentration than its concentration in the natural gas feed provided to the plant, because a liquid product containing no helium is removed from the operating process.

Figure 1:
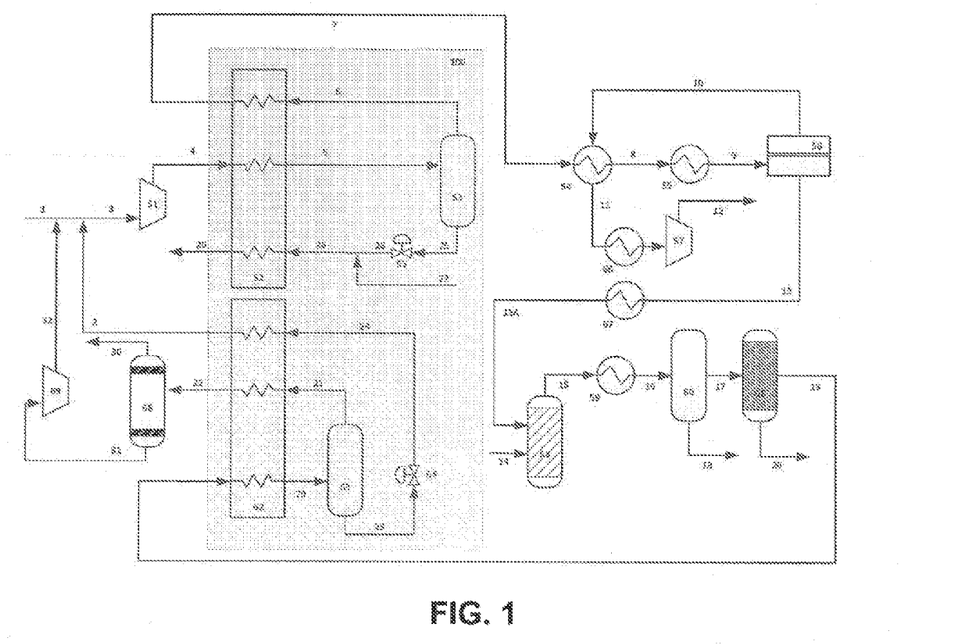
FIG. 1 is a graphical representation of an embodiment of the present invention including a cryogenic air separation unit in combination with at least one hydrogen transport membrane.

With reference to FIG. 1, an exemplary embodiment of the invention is provided. A feed gas (1) containing helium, hydrogen, and at least one other component mixes with recycle stream (2) and, optionally, compressed tail gas (32), forms low-pressure mixed feed (3). The mixed gas contains helium, hydrogen, and at least one other higher-boiling component. As employed herein, a higher-boiling component will be understood by those skilled in the art to be a material that has a higher boiling point than both helium and hydrogen. Possible higher-boiling components include nitrogen, methane, argon, and carbon monoxide. For example, a mixed gas stream from ammonia production could contain about 30% hydrogen, 60% methane, and 10% nitrogen with about 1% helium. Another ammonia plant could remove methane and produce a mixed gas with about 70% hydrogen, 23% nitrogen, 6% argon, and 1% helium. A mixed gas stream from a gas-to-liquid (GTL) hydrocarbon production process could contain 2-10% methane, 20-50% hydrogen, 0-10% nitrogen, 10-30% $CO_2$, 20-40% CO, 0-3% water, 0-2% argon, and 0.1-3% helium.

Additional removal capability (not shown) may be required if the higher-boiling components include water, carbon dioxide, and/or $C_{2+}$ hydrocarbons that could freeze and potentially plug equipment in the cryogenic separation unit (100), discussed below. The low-pressure feed (3) is compressed to a preferred pressure of about 200-600 psig in feed compressor (51) to form compressed feed (4), and then separated in the cryogenic separation unit (100). The cryogenic separation unit comprises two multi-stream heat exchangers, phase separators, valves, and connecting conduits. The compressed feed (4) is cooled in a first multi-stream heat exchanger (52) within the cryogenic separation unit (100) to produce partially condensed cooled feed (5) at a temperature of about −193 to −173° C. Partially condensed cooled feed (5) is separated in a phase separator (53) forming vapor stream (6) predominantly comprising hydrogen and helium (i.e., at least 80% with at least 70% hydrogen) with smaller amounts of higher boiling components and a liquid stream (25) consisting primarily of higher-boiling components. Liquid stream (25) will contain more than 50%, (i.e., a majority) of the higher-boiling components that were in partially condensed cooled feed (5) and will consist of predominantly, at least 80%, higher-boiling components by volume. The composition of liquid stream (25) is determined by the composition of the feed gas (1) and the temperature of the partially condensed cooled feed. For example, liquid stream (25) could contain about 85% methane and about 15% nitrogen with a small amount of hydrogen for a feed composition with 60% methane and 10% nitrogen. Liquid stream (25) is expanded through valve (65) to reduce its temperature and form reduced-pressure liquid stream (26). The expansion provides refrigeration for the cryogenic separation unit. Optionally, liquid nitrogen feed (27) is added to liquid stream (26) to provide supplemental refrigeration in the cryogenic separation unit (100). Both mixed liquid stream (28) and vapor stream (6) are warmed through first multi-stream heat exchanger (52) against compressed feed (4). The stream containing higher boiling components is recovered from the cryogenic separation unit as gaseous stream (29), which can be returned to the original operating process, used as a fuel, used for another application, or vented, depending on its composition. The stream containing hydrogen and helium is recovered as membrane feed (7).

Membrane feed (7) is heated against hot permeate (10) (discussed in detail below) in heat exchanger (54) forming warm membrane feed (8), which is further heated in heater (55) to form hot membrane feed (9), which is fed to membrane separator (56) operating at elevated temperature. Membrane separator (56) contains one or more hydrogen transport membranes arranged in one or more stages to selectively permeate hydrogen. These membranes operate only at elevated temperature and, for example, can be of palladium, palladium alloy, vanadium, niobium, tantalum, ceramic proton conducting materials such as $BaCeO_3$, another material that selectively permeates hydrogen and does not permeate helium, or combinations thereof. Some example membranes are those described in U.S. Pat. Nos. 6,281,403, 6,899,744, 7,781,049, and 8,101,243, which are incorporated herein by reference in their entirety. Preferred operating temperature for Pd or Pd alloy based membranes is 250-_550° C. Preferred temperature for proton conducting ceramic membranes is 550-1000° C. A portion of the hydrogen in hot membrane feed (9), preferably most of the hydrogen, permeates the membrane in membrane separator (56) to form hot permeate (10), which provides heat to membrane feed (7) in heat exchanger (54) and exits as low-pressure hydrogen product (11). Low-pressure hydrogen product (11) is cooled in a cooler (66) to a temperature of about 20-50° C. and then compressed in hydrogen compressor (57) to produce high-pressure hydrogen product (12). High-pressure hydrogen product (12) can be returned to the operating process or recovered for other purposes. If returned, it can be compressed to the operating pressure of the unit operation in the process to which hydrogen is returned. For ammonia and methanol production processes, hydrogen can be returned to the syngas production section just upstream of the syngas compressor, typically at 200-500 psig. For a GTL process, hydrogen can be returned upstream of the Fischer-Tropsch reactor at 300-500 psig. If hydrogen is recovered for other purposes, it will typically be compressed to tube trailer, pipeline, or cylinder operating pressure, generally between 500-2500 psig.

Figure 1A:
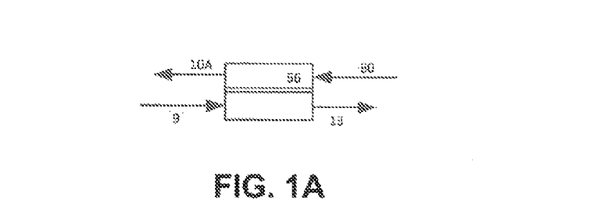
FIG. 1A is a schematic illustrating the hydrogen flux through the hydrogen transport membrane.

Optionally, and with reference to FIG. 1A, a sweep stream (80) can be used to decrease the hydrogen partial pressure on the permeate side of the membrane(s) to increase hydrogen flux through membrane (56). This sweep stream mixes with the permeated hydrogen to form hot permeate (10A). The sweep stream must be a gas or vapor at the operating conditions of the membrane separator (56). A preferred sweep stream composition can be selected to be compatible with returning the high-pressure hydrogen product (12) to the operating process. For example, nitrogen is a preferred sweep stream for returning the high-pressure hydrogen-nitrogen mixture product to an ammonia synthesis operating process. Alternatively, steam can be selected as the sweep stream composition and removed by condensation to recover relatively pure hydrogen product at high pressure to eliminate compressor (57) completely or to reduce the pressure ratio required in said compressor. The preferred pressure of the sweep stream is determined by the end use of the recovered stream, which sets the minimum hydrogen fraction required in the hot permeate (10A). The hydrogen partial pressure of the hot permeate must be less than the hydrogen partial pressure of the retentate (13) at all points along the length of the hydrogen transport membrane. Preferably the sweep stream flows countercurrently to the hot membrane feed, maximizing the allowable hydrogen partial pressure of the hot permeate.

Referring back to FIG. 1, the remainder of the hot membrane feed (9) that does not permeate the membrane exits membrane separator (56) as retentate (13). The retentate (13) typically contains 3-30% hydrogen by volume. The retentate is cooled in cooler (67) to a temperature of about 20-50° C. forming cooled retentate (13A), which is fed to the oxidation unit (58) along with an oxidant (14). Residual hydrogen is consumed in the oxidation unit (58) by reaction with oxygen. The oxidant (14) can be an oxygen-containing gas, such as oxygen, oxygen-enriched air, or air. Oxidation unit (58) could contain catalyst to promote the oxidation reaction. Reaction between hydrogen and oxygen produces water vapor and raises the temperature in the oxidation unit due to the exothermic nature of the reaction. Preferably, the amount of oxidant supplied is set such that the oxygen is in stoichiometric amount necessary for reaction with hydrogen in retentate for reaction (1) to consume remaining hydrogen or in slight excess.

$$2H_2+O_2 \rightarrow 2H_2O \qquad (1)$$

The oxidation unit effluent (15) is cooled in cooler (59) to condense out water vapor. Cooled effluent (16) is separated in phase separator (60) into water (18) and gas stream (17) containing helium. The gas stream (17) is further dried in dryer (61) to produce dried helium-containing stream (19) and removed water stream (20). Dryer (61) contains adsorbent or other means to remove water and other materials that could freeze in the cryogenic separation unit (100). If the hydrogen content of the retentate (13) is above about 5% by volume, the temperature rise in the oxidation unit could be too high, causing problems with the materials of construction of the unit or the catalyst or reaction with methane when present. Typically, temperatures below about 375° C. are desirable.

Figure 1B:
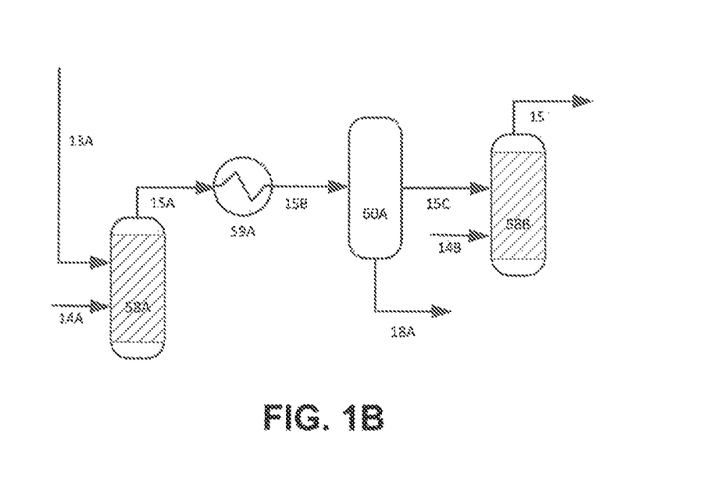
FIG. 1B is a schematic illustration of the oxidation unit utilized in the embodiment of FIG. 1.
Figure 1C:
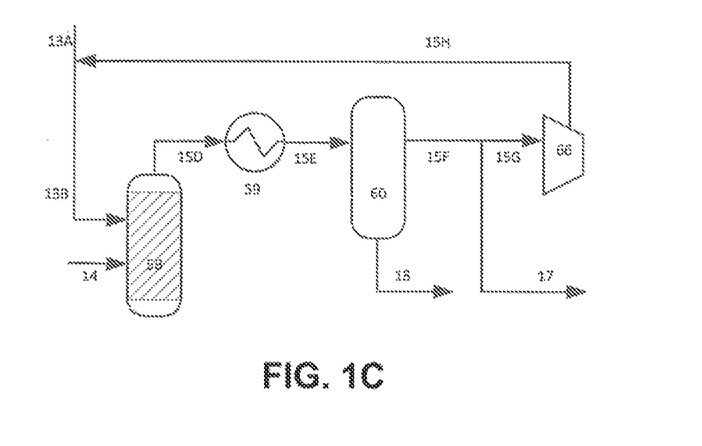
FIG. 1C is a schematic illustration of the oxidation unit utilized in the embodiment of FIG. 1 with a recycle loop.

As illustrated in FIG. 1B, the oxidation unit (58) may be comprised of more than one oxidation stage or require recycle as shown in FIG. 1C to limit the increase in operating temperature due to heat released by oxidation. For example, a retentate stream that contained about 5-10% hydrogen by volume might require two stages, such as (58A) and (58B) in FIG. 1B. The oxidation product stream (15A) from the first oxidation stage (58A) is cooled in interstage cooler (59A) to about 20-50° C. and the cooled first-stage product (15B) is fed to interstage phase separator (60A) to remove condensed water (18A) while the interstage gas phase stream (15C) is fed to the second oxidation stage (58B) where it is mixed with second-stage oxidant (14B), producing oxidation unit effluent (15). More than two oxidation stages (not shown) will be required for a retentate stream containing more than about 10% hydrogen by volume. In the case of a dual-stage or multi-stage oxidation unit, the amount of oxidant supplied to each stage would be limited so that only a portion of the hydrogen in the retentate would be oxidized in each stage and the temperature rise within each stage will be below the desired limit. The oxidant supplied in the last stage of the dual-stage or multi-stage oxidation unit will be in the stoichiometric amount necessary to consume the residual hydrogen entering the last stage. Fresh oxidant (14A) and (14B) would be supplied to each stage to consume the amount of hydrogen necessary to limit the operating temperature while still consuming sufficient hydrogen to provide a helium product with appropriate purity.

Alternatively, and as illustrated in FIG. 1C, a single oxidation unit with recycle could be employed such that a combined feed entering the oxidation unit would contain 5% or less hydrogen by volume. In this configuration, a recycled portion (15H) of the oxidation unit effluent (15F) can be recycled to the oxidation unit (58) inlet using oxidation recycle blower or compressor (66) to dilute the hydrogen concentration of the oxidizer feed (13B) to less than 5%, thereby limiting the temperature rise in the oxidation unit (58). The oxidation unit effluent (15D) is cooled in cooler (59) to produce cooled oxidation effluent (15E), which is fed to phase separator (60) that removes condensed water (18). The gas exiting phase separator (60) is split into recycled portion (15G), which is compressed in recycle compressor (66), producing compressed recycled portion (15H) and combined with cooled retentate (13A) to produce oxidizer feed (13B), and oxidation unit effluent (17). The relative split is done to ensure that enough material is recycled so that the hydrogen concentration in the oxidizer feed (13B) is below about 5%.

Referring back to FIG. 1, dried helium-containing stream (19) is sent to the cryogenic separation unit (100) for separation of higher boiling components from helium, where it is cooled to about −193 to −173° C. in second multi-stream heat exchanger (62) to form partially condensed stream (20), which is separated in a third phase separator (63) to form liquid and vapor streams. The majority of higher boiling components are recovered in liquid stream (23) and most of the helium is recovered in the vapor stream (21) with a helium concentration of 80% by volume or greater. Liquid stream (23) is expanded through valve (64) to form higher boiling component liquid (24) to generate refrigeration for the cryogenic process. Helium containing vapor (21) and higher boiling component liquid (24) are warmed in heat exchanger (62) against dried helium-containing stream (19) and recovered as crude helium product (22) and gaseous stream (2) containing higher boiling components. Gaseous stream (2) contains some of the helium that was present in dried helium-containing stream (19). To improve overall recovery of helium from the plant, gaseous stream (2) is recycled and mixed with the fresh feed (1). Crude helium product (22) can be compressed (not shown) to 2000-2500 psig, for example, if it is desired to have the crude helium product available at higher pressure. This will occur if the crude helium product is to be transported in high-pressure cylinders or tube trailers to a helium refinery for final purification and liquefaction. The two multi-stream exchangers (52) and (62) can be combined to reduce capital cost and simplify operation.

Crude helium product (22) can be further purified in helium purifier (68) to produce a purified helium product (30) and helium purifier tailgas (31). Purified helium product (30) contains more than 98% helium. Purification is accomplished using adsorption as described in U.S. Pat. No. 5,080,694; a combination of membrane separation and adsorption as described in U.S. Pat. No. 5,632,803, a combination of liquefaction and adsorption as described in U.S. Pat. No. 4,659,351, or other appropriate means. The disclosure of these documents is incorporated herein by reference in their entirety. Helium purifier tailgas (31) contains helium and is compressed in tail gas compressor (69) to produce compressed tail gas (32), which is combined with mixed gas (1) and fed to the inlet of the helium recovery process.

Figure 2:
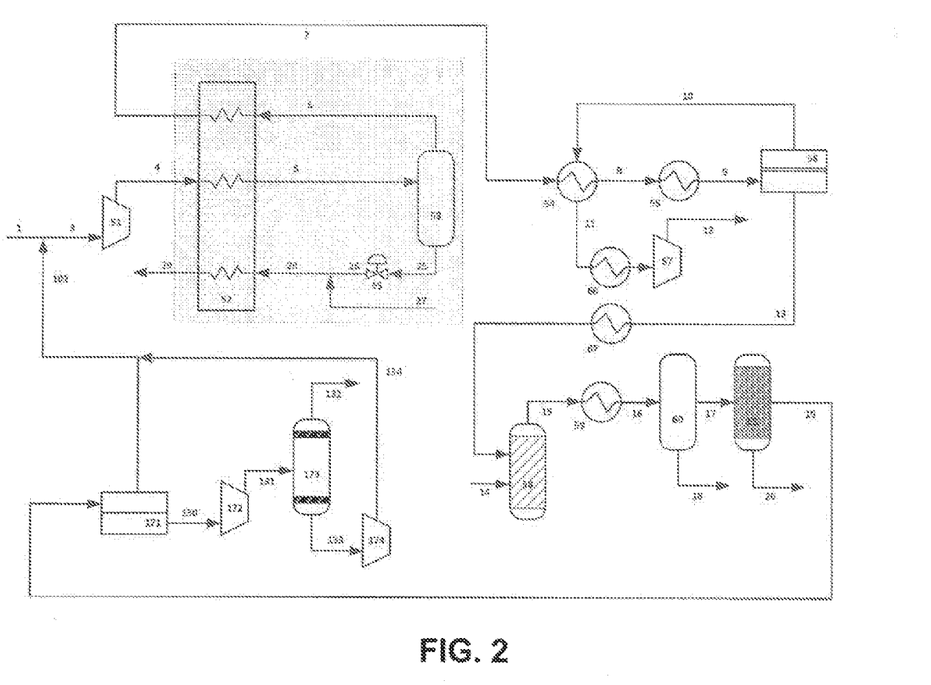
FIG. 2 is a graphical representation of another embodiment of the present invention wherein part of the cryogenic air separation unit is replaced by a size-selective membrane separator.

Another embodiment of the present invention is shown in FIG. 2. All streams from the mixed gas (1) through the dried helium containing stream (19) and all unit operations from the feed compressor (51) to the dryer (61) are as described for FIG. 1. In this embodiment, a size-selective membrane separator (171) is used to purify dried helium containing stream (19) instead of a cryogenic separation unit. Size-selective membranes separate gas streams based on the size of the molecule with smaller molecules, such as hydrogen and helium, permeating the membrane while larger molecules such as nitrogen and methane do not pass through the membrane.

Dried helium-containing stream (19) enters size-selective membrane separator (171) and is separated into size-selective membrane separator permeate (130) and size-selective membrane separator retentate (102). Size-selective membrane separator (171) can consist of a single membrane stage or more than one membrane stage with internal recycle and compression, such as the system shown in FIG. 2A, and contains a membrane or membranes that separates helium from the higher-boiling components, such as nitrogen and/or methane with sufficient selectivity to enable recovery of a crude helium product (131) containing at least about 80% helium. These membranes can be polymeric membranes that separate gases based on molecular size or other appropriate membranes that selectively permeate helium over larger gas molecules. An example is the membrane described in U.S. Pat. No. 5,224,350, which is incorporated herein by reference in its entirety. The size-selective membrane separator retentate (102) can be vented (not shown) or recycled and combined with the feed gas (1). The size-selective membrane separator permeate (130) is compressed in helium compressor (172) to produce crude helium product (131), which can be recovered as product or sent for further purification to helium purifier (173) to produce purified helium product (132) and helium purifier effluent (133), which is compressed in effluent compressor (174) to produced compressed purifier effluent (134), which is recycled to the inlet of the process to recover residual helium. As in the embodiment of FIG. 1, the helium purifier can be a pressure swing adsorption unit, a combination of a membrane separator and adsorption unit, a combination of a liquefier and adsorption unit, or other appropriate means.

Figure 2A:
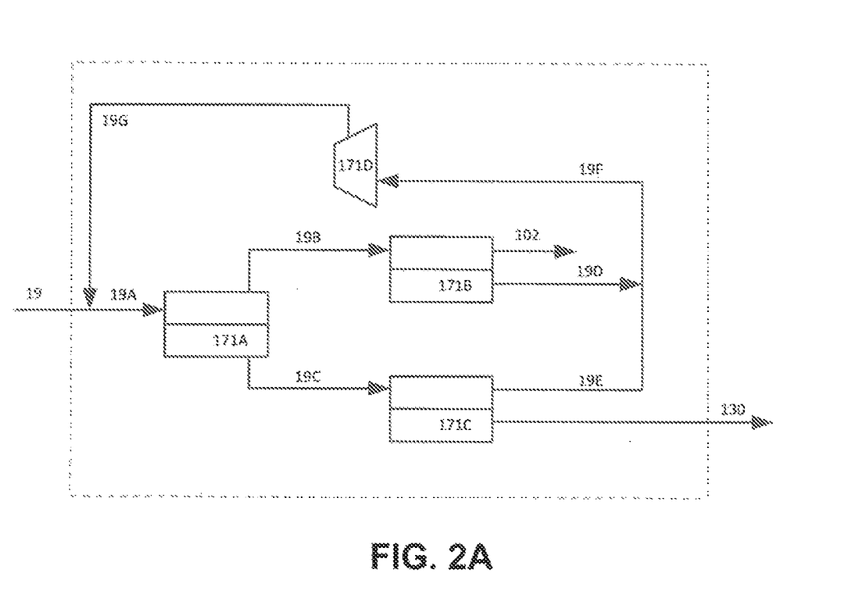
FIG. 2A is a schematic of a size-selective membrane separator, which is a multi-stage unit.

In the embodiment of FIG. 2, the size-selective membrane separator (171) could be a multi-stage unit. An example of a multistage size-selective membrane separator system is shown in FIG. 2A. This configuration and many other multi-stage membrane processes are described in more detail in U.S. Patent Application Publication No. 2013/0098242 A1, which is incorporated herein as reference in its entirety. Another example multistage size-selective membrane separator is described in U.S. Pat. No. 7,604,681, also incorporated herein by reference in its entirety.

Dried helium-containing stream (19) mixes with membrane recycle (19G) to form first-stage membrane feed (19A) and enters first-stage membrane separator (171A), where it is separated into first-stage membrane retentate (19B), which contains a lower concentration of helium than first-stage membrane feed (19A), and first-stage membrane permeate (19C) which contains a higher concentration of helium than first-stage membrane feed (19A) and is at a lower pressure than first-stage membrane feed (19A).

First-stage membrane retentate (19B) enters second-stage membrane separator (171B) where it is separated into size-selective membrane separator retentate (102), which contains a lower concentration of helium than first-stage membrane retentate (19B), and second-stage membrane permeate (19D), which contains a higher concentration of helium than first-stage membrane retentate (19B) and is at a lower pressure than first-stage membrane retentate (19B). Size-selective membrane separator retentate (102) is recycled to the inlet of the process as shown in FIG. 2.

First-stage membrane permeate (19C) enters third-stage membrane separator (171C), where it is separated into size-selective membrane separator permeate (130), which contains a higher concentration of helium than first-stage membrane permeate (19C) and third-stage membrane retentate (19E), which contains a lower concentration of helium than first-stage membrane permeate (19C). Third-stage membrane retentate (19E) is combined with second-stage membrane permeate (19D) to form low-pressure membrane recycle (19F), which is compressed in membrane recycle compressor (171D) to a pressure at least as high as the pressure of dried helium-containing stream (19), forming membrane recycle (19G). Size-selective membrane separator permeate (130) is compressed in helium compressor (172) as described previously to produce a crude helium product (131).

The invention is further explained through the following Examples, which are based on various embodiments of the system, but are in no way to be construed as limiting the present invention.

Example 1

In the embodiment of FIG. 1, 377 lbmol/hr of feed gas (1) consisting of 60% methane, 30% hydrogen, 9% nitrogen, 0.5% helium, and 0.5% argon is fed to the process of this embodiment. Feed compressor (51) raises the pressure of the low-pressure mixed feed gas (3) to 505 psia. Operating at higher pressure improves the effectiveness of the cryogenic separation unit (100). First heat exchanger (52) decreases the temperature of the stream to −173° C., liquefying a portion of the stream. One hundred twenty-two (122) lbmol/hr of vapor (6) containing 2% helium and 89% hydrogen exits first phase separator (53), which removes more than 99% of the methane and more than 97% of the nitrogen from the cooled feed (5). The vapor stream is heated and sent to hydrogen transport membrane (56) that removes about 98% of the hydrogen so that retentate (13) has a flow rate of 14.6 lbmol/hr and contains 16% helium and only 4% hydrogen. This stream is combined with 1.5 lbmol/hr of air and fed to oxidizer (58) to remove substantially all of the residual hydrogen by reacting it with oxygen from the air. After water is removed, stream (19) has a flow rate of 15 lbmol/hr, contains 16% helium and at most a trace of hydrogen, and is cooled in heat exchanger (62) to about −180° C. Partially condensed stream (20) is separated in third phase separator (63) forming helium-rich vapor stream (21) with a flow rate of 2.3 lbmol/hr containing 81% helium with the remainder almost entirely nitrogen. This stream can be further purified in helium purifier (68) to produce a stream that is substantially pure helium. In this case, nearly all of the helium in the feed stream is recovered as product with most of the separation done by cryogenic separation and the hydrogen/helium separation performed by the membrane. This process takes advantage of an economical cryogenic separation techniques combined with membranes that have the unique capability of separating hydrogen and helium from each other to produce a purified helium product stream. Conditions and compositions of selected streams for Example 1 are shown in Table 1.

TABLE 1

Stream conditions and compositions for Example 1.

| | Stream No. | | | | | | |
|---|---|---|---|---|---|---|---|
| | 1 | 4 | 5 | 6 | 9 | 10 | 13 |
| Temp. (C.) | 38 | 38 | −173 | −173 | 350 | 350 | 350 |
| Press. (psia) | 49 | 505 | 503 | 503 | 495 | 20 | 485 |
| Flow (lbmol/hr) | 377 | 390 | 390 | 122 | 122 | 108 | 14.6 |
| Composition (%) | | | | | | | |
| Helium (He) | 0.5 | 0.6 | 0.6 | 2.0 | 2.0 | 0 | 16 |
| Hydrogen ($H_2$) | 30 | 29 | 29 | 89 | 89 | 100 | 4 |
| Nitrogen ($N_2$) | 9 | 11 | 11 | 7.8 | 7.8 | 0 | 65 |
| Argon (Ar) | 0.5 | 0.5 | 0.5 | 0.1 | 0.1 | 0 | 1 |
| Methane ($CH_4$) | 60 | 59 | 59 | 1.6 | 1.6 | 0 | 14 |

| | Stream No. | | | | | |
|---|---|---|---|---|---|---|
| | 19 | 21 | 23 | 25 | 30 | 31 |
| Temp. (C.) | 38 | −179 | −179 | −173 | 25 | 25 |
| Press. (psia) | 480 | 476 | 476 | 503 | 470 | 30 |
| Flow (lbmol/hr) | 15.2 | 2.3 | 12.9 | 267 | 1.6 | 0.7 |
| Composition (%) | | | | | | |
| Helium (He) | 16 | 81 | 4 | 0 | 100 | 38 |
| Hydrogen ($H_2$) | 0 | 0 | 0 | 1.8 | 0 | 0 |
| Nitrogen ($N_2$) | 70 | 19 | 79 | 13 | 0 | 62 |
| Argon (Ar) | 1 | 0.2 | 1 | 0.7 | 0 | 0 |
| Methane ($CH_4$) | 13 | 0.2 | 15 | 85 | 0 | 0 |

Example 2

Example 2 illustrates the performance of the membrane system shown in the embodiment of FIG. 2. In this case, the size-selective membrane system is used to produce helium product instead of the second cryogenic separator shown in FIG. 1. Dried helium-containing stream (19) has a flow rate of 15 lbmol/hr, contains 13% helium and at most a trace of hydrogen, and is fed to size-selective membrane separator (171). Size-selective membrane separator permeate (130) is compressed in first helium compressor (172) and purified in helium purifier (173). The membrane retentate is recycled to the process inlet as recycle (102). Helium purifier (173) produces purified helium product (132) and helium purifier effluent (133), which can contain a significant amount of helium with the remainder almost entirely nitrogen. Helium purifier effluent is recycled to the process inlet so that nearly all of the helium in the feed stream is recovered as product with most of the separation done by cryogenic separation and the hydrogen/helium separation performed by the hydrogen transport membrane (56), and further helium purification done by the size-selective membrane (171) and helium purifier (173). This process takes advantage of well-known economical cryogenic separation, size-selective membranes, and selective adsorption techniques combined with membranes that have the unique capability of separating hydrogen and helium from each other to produce a purified helium product stream. Conditions and compositions of selected streams for Example 2 are shown in Table 2.

TABLE 2

Stream conditions and compositions for Example 2.

| | Stream No. | | | | |
|---|---|---|---|---|---|
| | 19 | 102 | 131 | 132 | 133 |
| Temp. (C.) | 38 | 38 | 38 | 38 | 38 |
| Press. (psia) | 478 | 475 | 215 | 210 | 30 |
| Flow (lbmol/hr) | 15 | 12.8 | 2.1 | 1.6 | 0.5 |
| Composition (%) | | | | | |
| Helium (He) | 13 | 1 | 90 | 100 | 59 |
| Hydrogen ($H_2$) | 0 | 0 | 0 | 0 | 0 |
| Nitrogen ($N_2$) | 72 | 82 | 9 | 0 | 37 |
| Argon (Ar) | 1 | 1 | 0 | 0 | 0 |
| Methane ($CH_4$) | 13 | 16 | 1 | 0 | 4 |

As shown in these embodiments a mixed feed stream having a very low concentration of helium can be processed in the integrated process and apparatus of the present invention for recovery of a helium rich stream. While the invention has been described in detail with reference to specific embodiments thereof, it will become apparent to one skilled in the art that various changes and modifications can be made, and equivalents employed, without departing from the scope of the appended claims.

What is claimed is:

1. An integrated process for recovery of a helium rich stream and a hydrogen rich stream from a feed stream containing 10-80 volume percent hydrogen, 0.1-5.0 volume percent helium, and the balance being higher boiling components, comprising:
    (a) routing the pressurized feed stream to a cryogenic separation unit wherein the majority of the higher boiling components are separated and removed from the feed stream;
    (b) heating a stream containing helium removed from the cryogenic separation unit and routing the heated stream to at least one hydrogen transport membrane where the heated stream is separated into a hydrogen rich permeate stream, and a retentate stream depleted of hydrogen;
    (c) routing the retentate stream depleted of hydrogen to at least one oxidation unit and reacting it with an oxidant to remove substantially all the remaining hydrogen in the retentate to produce a helium containing stream, wherein the helium concentration ranges from about 5-40 volume percent and the balance being higher boiling components;
    (d) routing the helium containing stream to a phase separator and sequentially a dryer wherein most of the water is removed; and
    (e) routing the dried helium containing stream to the same or a different cryogenic separation unit where the majority of remaining higher-boiling components are removed and a helium rich product stream having about 80% or higher helium content by volume is obtained.

2. The integrated process of claim 1, wherein the feed stream composition comprises by volume 10-80% hydrogen, 0.1-5% helium, 10-90% one or more higher boiling components from the group comprising methane or other hydrocarbons, nitrogen, argon, carbon monoxide and impurities.

3. The integrated process of claim 1, wherein the feed stream is cooled in a cryogenic separation unit against an outlet stream containing predominantly higher boiling components and a separate product stream containing predominantly hydrogen and helium.

4. The integrated process of claim 1, wherein the heated feed stream is at a temperature in the range of about 250-1000° C.

5. The integrated process of claim 1, wherein the hydrogen rich permeate stream is recovered by utilizing a sweep stream to produce a mixture of hydrogen and sweep gas.

6. The integrated process of claim 5, wherein the hydrogen rich permeate stream is recovered by utilizing steam as a sweep stream at pressure and then cooling a steam-hydrogen mixture to condense water and recover hydrogen at a pressure higher than its partial pressure in the retentate stream.

7. The integrated process of claim 5, wherein the sweep stream is nitrogen or other inert gases.

8. The integrated process of claim 1, wherein the hydrogen transport membrane is a two-stage membrane, wherein the hydrogen permeate is recovered at 15-25 psia in the first stage and in the second stage additional hydrogen permeate is recovered under vacuum or by utilizing a sweep stream.

9. The integrated process of claim 1, wherein the retentate stream depleted of hydrogen exiting the hydrogen transport membrane is cooled to 30 to 100° C. prior to routing to the oxidation unit.

10. The integrated process of claim 1, wherein the oxidant is selected from the group consisting of air, oxygen-enriched air, and oxygen.

11. The integrated process of claim 1, wherein the oxidation unit is a catalytic oxidation unit to enhance reaction between hydrogen and oxidant.

12. The integrated process of claim 1, wherein intercoolers and phase separators are employed where two or more catalytic oxidation units are employed to reduce the temperature of effluent from each oxidation unit and to remove condensed water in the helium containing stream.

13. The integrated process of claim 1, wherein the helium rich product stream is further compressed and sent to a helium refinery for further purification and/or liquefaction.

14. The integrated process of claim 1, further comprising compressing the feed stream prior to routing to the cryogenic separation unit.

15. The integrated process of claim 1, further comprising recovering the hydrogen rich permeate stream.

16. The integrated process of claim 1, further comprising compressing a portion of dried helium containing stream and recycling said portion by combining said portion with the hydrogen retenate upstream of the oxidation unit.

17. The integrated process for recovery of a helium rich stream from a feed stream containing 10-80 volume percent of hydrogen, 0.1-5.0 volume percent helium, and the balance being higher boiling components, comprising:
    (a) routing the pressurized feed stream to a cryogenic separation unit wherein the majority of the higher boiling components are separated and removed from the feed stream;
    (b) heating the feed stream removed from the cryogenic separation unit and routing the heated feed stream to at least one hydrogen transport membrane where the feed stream is separated into a hydrogen rich permeate stream, and a retentate stream depleted of hydrogen;
    (c) routing the retentate stream depleted of hydrogen to at least one oxidation unit to remove substantially all the hydrogen remaining in the retentate to produce a helium containing stream, wherein the helium concentration ranges from about 5-40 volume percent and the balance being higher boiling components;

(d) routing the helium containing stream to a phase separator and sequentially a dryer wherein most of the water is removed; and (e) further processing the helium containing stream of step (d) in one or more polymeric membrane stages, wherein the permeate is recovered as helium rich product stream having about 80% or higher helium content by volume.

18. The integrated process of claim 17, where the helium containing stream in step (e) is processed in a first polymeric membrane stage where the helium containing stream is separated into a first retentate stream and a first permeate stream having at least about 30% helium content.

19. The integrated process of 19, where the permeate stream having at least about 30% helium content is further separated in a third polymeric membrane stage into a third retentate stream which can be recycled to the first polymeric membrane and a third permeate stream recovered as helium rich product having about 80% or higher helium content by volume.

20. The integrated process of claim 19, wherein the third permeate stream recovered as helium rich product having about 80% or higher helium content by volume is further compressed to a pressure compatible with the downstream delivery point.

21. The integrated process of claim 19, wherein the downstream delivery point is either a storage tank or a helium refinery.

22. The integrated process of claim 17, wherein the third permeate stream recovered as helium rich product contains less than about 1% methane and balance being other higher boiling components.

23. The integrated process of claim 1, wherein the feed stream is generated as a by-product in a process that uses natural gas to produce a liquid product, such as ammonia, methanol, or higher hydrocarbons.

24. The integrated process of claim 17, wherein the helium-rich product stream having at least 80% helium content by volume is further processed to produce a purified helium product stream containing at least 98% helium content by volume.

25. The integrated process of claim 17, wherein the helium-rich product stream is further routed through a pressure swing adsorption apparatus for final purification.

* * * * *